United States Patent
Ruben

[11] 3,838,910
[45] Oct. 1, 1974

[54] THREE ELEMENT PROJECTION LENS
[75] Inventor: Paul Lewis Ruben, Penfield, N.Y.
[73] Assignee: Eastman Kodak Company, Rochester, N.Y.
[22] Filed: Apr. 24, 1973
[21] Appl. No.: 354,046

[52] U.S. Cl................................. 350/176, 350/226
[51] Int. Cl. ............................................. G02b 1/00
[58] Field of Search....................... 350/2, 176, 226

[56] References Cited
UNITED STATES PATENTS
2,270,234  1/1942  Warmisham..................... 350/176
2,720,816  10/1955  Sandbach........................... 350/226
3,160,700  12/1964  Snyder............................... 350/226

Primary Examiner—Ronald L. Wibert
Assistant Examiner—Conrad Clark
Attorney, Agent, or Firm—Donald D. Schaper

[57] ABSTRACT

A projection lens comprising three air spaced elements, namely a positive meniscus element, a negative biconcave middle element and a positive biconvex rear element, with each element being formed of a glass having an index of refraction in excess of 1.90 or an Abbe number less than 40.

6 Claims, 1 Drawing Figure

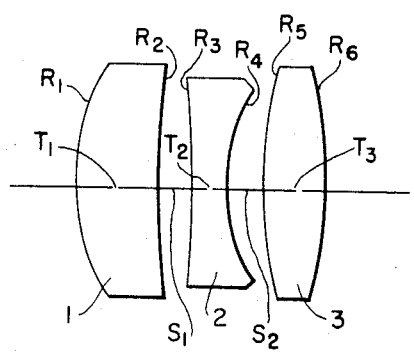

THREE ELEMENT PROJECTION LENS

BACKGROUND OF THE INVENTION

1. Field of the Invention

This invention relates to lenses and in particular to a three element lens which is adapted for the projection of images from microfilm.

2. Description of the Prior Art

The quality required of a projection lens is partially dependent upon its intended use and inversely dependent on the image magnification factor. For example, projection of micro-images usually requires less magnification than does ordinary 35mm. slide projection, so that lenses having better resolution and aberration corrections are usually used for microfilm projection readers. Still greater lens quality may be requied for projection printing magnified copies from microflim, since the magnification factor is commonly smaller for such copiers than for most microfilm projection readers. Known lenses of suitable quality for use as micro-image projectors have generally consisted for four or more elements. Such lenses are usually more expensive than a three element lens because of the additional cost of manufacturing and mounting an additional element.

SUMMARY OF THE INVENTION

Accordingly, it is an object of this invention to provide three element triplet lenses suitable for use in projection systems and in particular for use in the projection of images from microfilm.

It is another object of this invention to provide such triplet lenses which are well corrected for distortion, spherical, comatic, astigmatic and chromatic aberrations.

It is a still further object of this invention to provide such triplet lenses which are characterized by a curved image field.

It is also an object of this invention to provide such triplet lenses in which the elements are characterized by indices of refraction in excess of 1.90.

These and other objects are accomplished according to the present invention by triplet lenses comprising three air-spaced elements manufactured from high index glasses and arranged from front to rear in the following order: a front positive meniscus element; a middle biconcave negative element; and a rear positive biconvex element.

BRIEF DESCRIPTION OF THE DRAWING

In the detailed description of the preferred embodiments of the invention presented below, reference is made to the accompanying drawing which is a diagrammatic cross-section of a lens according to this invention.

DESCRIPTION OF THE PREFERRED EMBODIMENTS

For all purposes of describing or claiming the invention herein, the term lens will be used to described the complete lens, and not the elements thereof. In the drawing, the elements are numbered from left to right with Arabic numerals. In each of the examples, the elements, indices of refraction N, Abbe numbers V, radii of curvature R, thicknesses T, and air spaces S are numbered to correspond with the drawing. The indices of refraction are for the 0.5893 microm sodium D-line of the spectrum. The Abbe numbers are calculated utilizing the D-line index and, as the main dispersion, the index difference between the 0.4861 micron hydrogen F-line and the 0.6563 micron hydrogen C-line. Radii of curvature having centers of curvature to the right of the surface are considered positive; those with centers of curvature to the left of the surface are considered negative. All parameters are based upon a lens focal length of 100 millimeters.

In all embodiments of the invention as illustrated in the drawing, the lens comprises three air-spaced elements. Element 1 is a front positive meniscus element. Element 2 is a middle negative biconcave element. Element 3 is a rear positive biconvex element.

Lenses may be made according to this invention by following the specifications in the preferred embodiments presented below:

EXAMPLE I

F.L.=100mm  f/2.50

| Element | Radius (mm) | Thickness or Separation (mm) | N | V |
|---|---|---|---|---|
| 1 | $R_1$=49.53 | $T_1$=16.97 | 1.94283 | 36.1 |
|   | $R_2$=195.69 | $S_1$=8.59 |   |   |
| 2 | $R_3$=−188.13 | $T_2$=8.00 | 1.94910 | 20.4 |
|   | $R_4$=42.293 | $S_2$=7.93 |   |   |
| 3 | $R_5$=95.029 | $T_3$=14.87 | 1.94283 | 36.1 |
|   | $R_6$=−95.029 |   |   |   |

The lens illustrated in Example I is designed to project an image which is magnified by a factor of 37.894 onto a viewing screen which is concave to the lens and which has a spherical surface with a 180 inch radius. The lens is further characterized by a relative aperture of f/2.50 and a half-field angle of 20.02°.

EXAMPLE II

F.L.=100mm  f/2.50

| Element | Radius (mm) | Thickness or Separation (mm) | N | V |
|---|---|---|---|---|
| 1 | $R_1$=49.53 | $T_1$=17.06 | 1.94283 | 36.1 |
|   | $R_2$=170.85 | $S_1$=7.90 |   |   |
| 2 | $R_3$=−190.47 | $T_2$=8.00 | 1.93664 | 20.8 |
|   | $R_4$=43.053 | $S_2$=7.33 |   |   |
| 3 | $R_5$=94.442 | $T_3$=13.62 | 1.94283 | 36.1 |
|   | $R_6$=−94.442 |   |   |   |

The lens described in Example II is designed to project am image which is magnified by a factor of 37.905 onto a screen which is concave to the lens and which has a spherical surface with a 180 inch radius. This lens is further characterized by a relative aperture of f/2.50 and a half-field angle of 20.00°.

EXAMPLE III

F.L.=100mm  f/2.80

| Element | Radius (mm) | Thickness or Separation (mm) | N | V |
|---|---|---|---|---|
| 1 | $R_1$=44.043 | $T_1$=12.00 | 1.94283 | 36.1 |
|   | $R_2$=154.22 |   |   |   |

EXAMPLE III-Continued

F.L.=100mm  f/2.80

| Element | Radius (mm) | Thickness or Separation (mm) | N | V |
|---|---|---|---|---|
| | | $S_1$=9.45 | | |
| 2 | $R_3$=−225.71 | $T_2$=5.78 | 1.94910 | 20.4 |
| | $R_4$=38.942 | | | |
| | | $S_2$=8.89 | | |
| 3 | $R_5$=98.549 | $T_3$=14.57 | 1.94283 | 36.1 |
| | $R_6$=−98.549 | | | |

The lens described in Example III is designed to project an image which is magnified by a factor of 33.232 onto a screen which is concave to the lens and has a spherical surface with a 144.5 inch radius. The lens is further characterized by a relative aperture of f/2.80 and a half-field angle of 20.50°.

EXAMPLE IV

F.L.=100mm  f/2.8

| Element | Radius (mm) | Thickness or Separation (mm) | N | V |
|---|---|---|---|---|
| 1 | $R_1$=43.418 | $T_1$=10.597 | 1.94283 | 36.1 |
| | $R_2$=152.15 | | | |
| | | $S_1$=10.120 | | |
| 2 | $R_3$=−234.00 | $T_2$=5.089 | 1.94910 | 20.4 |
| | $R_4$=38.567 | | | |
| | | $S_2$=8.982 | | |
| 3 | $R_5$=97.978 | $T_3$=16.710 | 1.94283 | 36.1 |
| | $R_6$=−97.978 | | | |

The lens described in Example IV is designed to project an image which is magnified by a factor of 29.031 onto a screen which is concave to the lens and has a spherical surface with a 127.2 inch radius. The lens is further characterized by a relative aperture of f/2.80 and a half-field angle of 20.50°.

The optical performance of lenses constructed in accordance with the parameters listed in Examples I–IV is illustrated in Table 1, with a comparison to presently available three and four element lenses utilizing medium index glasses. The lenses of Examples I–IV were constructed with the focal length and relative aperture listed under each example, rather than with the 100mm focal length utilized in Examples I–IV. The three and four element lenses are characterized by the focal length and relative aperture listed for each lens.

Table 1 lists modulation transfer function (MTF) data for two different spatial frequencies, with both saggital and tangential performance at differing field positions. The MTF is the efficiency of transfer of the amplitude of spatial waves through a lens. The MTF for an ideal lens is limited by diffraction, in the absence of aberrations. The presence of aberrations will tend to limit the MTF further. Thus, a lens which is characterized by a higher MTF than a second lens is generally characterized by reduced aberrations. In addition, a smaller MTF range for different field positions indicates more uniform quality across the image field. By comparing the MTF data for Examples I–IV with the data for the three and four element lenses, it may be seen that applicant's lenses are generally characterized by reduced aberrations and more uniform image quality, particularly when compared with a lens having the same focal length and relative aperture.

Particular attention should be paid to the index of refraction of the glasses from which the lens elements are made. Each of the indices is extremely high, all being in excess of 1.90. The use of these high index glasses aids in achieving the aberration corrections which result in the improved optical performance illustrated in Table 1. In addition, element 3 is symmetrical in design, which, while not required to achieve improved optical performance, reduces the cost of construction of the lens by eliminating the possibility of reversal of this element during assembly.

Although the invention has been described in detail with particular reference to certain preferred embodiments thereof, it will be understood that variations and modifications can be effected within the spirit and scope of the invention.

I claim:

1. A three element lens comprising, from front to rear, a positive meniscus element, a biconcave negative element and a biconvex positive element, each of said elements being formed of a glass having an index of refraction in excess of 1.90, wherein the lens has a focal length F and the radii of curvature, R, the thicknesses, T, and the air spaces, S, as numbered by subscript from

TABLE I

Modulation Transfer Function

| Spatial Frequency lines/mm | Field Position | Example 1 10mm f/2.5 | | Example 2 10mm f/2.5 | | Example 3 14mm f/2.8 | | Example 4 16mm f/2.8 | | 3 Element 19mm f/2.5 | | 4 Element 26mm f/2.5 | | 4 Element 10mm f/2.5 | |
|---|---|---|---|---|---|---|---|---|---|---|---|---|---|---|---|
| | | Sag. | Tan. | Sag. | Tan. | Sag. | Tan. | Sag. | Tan. | Sag. | Tan. | Sag. | Tan. | Sag. | Tan. |
| 3.0 | .0 | .64 | .64 | .63 | .63 | .66 | .66 | .65 | .65 | .70 | .70 | .47 | .47 | .47 | .47 |
| | .4 | .60 | .49 | .61 | .50 | .49 | .45 | .58 | .44 | .75 | .25 | .46 | .51 | .49 | .29 |
| | .6 | .45 | .16 | .43 | .21 | .37 | .29 | .38 | .30 | .54 | .16 | .49 | .62 | .35 | .13 |
| | .75 | .43 | .18 | .39 | .24 | .50 | .27 | .49 | .29 | .32 | .27 | .57 | .42 | .20 | .21 |
| | .9 | .52 | .40 | .48 | .39 | .57 | .36 | .59 | .36 | .14 | .44 | .42 | .19 | .08 | .42 |
| 2.4 | .0 | .72 | .72 | .72 | .72 | .72 | .72 | .72 | .72 | .77 | .77 | .56 | .56 | .58 | .58 |
| | .4 | .68 | .58 | .69 | .60 | .58 | .55 | .58 | .55 | .81 | .34 | .55 | .61 | .57 | .41 |
| | .6 | .55 | .25 | .54 | .30 | .47 | .42 | .48 | .42 | .64 | .21 | .57 | .67 | .43 | .24 |
| | .75 | .54 | .26 | .51 | .31 | .58 | .38 | .58 | .40 | .39 | .30 | .63 | .50 | .28 | .29 |
| | .9 | .60 | .49 | .56 | .48 | .65 | .46 | .66 | .48 | .29 | .53 | .50 | .27 | .15 | .48 | front to rear, are as defined by the following inequalities:

$$0.40F < R_1 < 0.50F$$
$$1.5F < R_2 < 2.0F$$
$$1.8F < -R_3 < 2.4F$$
$$0.35F < R_4 < 0.45F$$
$$0.90F < R_5 < 1.0F$$
$$0.90F < -R_6 < 1.0F$$
$$0.10F < T_1 < 0.20F$$
$$0.05F < T_2 < 0.10F$$
$$0.10F < T_3 < 0.20F$$
$$0.05F < S_1 < 0.15F$$
$$0.05F < S_2 < 0.10F$$

2. A three element projection lens comprising, from front to rear, a positive meniscus element, a biconcave element and a biconvex element, said lens having a focal length of 100 millimeters when constructed according to the parameters in the following table:

| Element | Radius (mm) | Thickness or Separation (mm) | N | V |
|---|---|---|---|---|
| 1 | $R_1$=49.53 | | | |
| | | $T_1$=16.97 | 1.94283 | 36.1 |
| | $R_2$=195.69 | | | |
| | | $S_1$=8.59 | | |
| 2 | $R_3$=−188.13 | | | |
| | | $T_2$=8.00 | 1.94910 | 20.4 |
| | $R_4$=42.293 | | | |
| | | $S_2$=7.93 | | |
| 3 | $R_5$=95.029 | | | |
| | | $T_3$=14.87 | 1.94283 | 36.1 |
| | $R_6$=−95.029 | | | | wherein from front to rear, the lens elements are numbered from 1 to 3, the corresponding indices of refraction, N, and Abbe numbers, V, are listed for each of the lens elements, the radii are numbered from $R_1$ to $R_6$, the thicknesses are numbered from $T_1$ to $T_3$ and the air spaces are numbered from $S_1$ to $S_2$.

3. A three element projection lens comprising, from front to rear, a positive meniscus element, a biconcave element and a biconvex element, said lens having a focal length of 100 millimeters when constructed according to the parameters in the following table:

| Element | Radius (mm) | Thickness or Separation (mm) | N | V |
|---|---|---|---|---|
| 1 | $R_1$=49.53 | | | |
| | | $T_1$=17.06 | 1.94283 | 36.1 |
| | $R_2$=170.85 | | | |
| | | $S_1$=7.90 | | |
| 2 | $R_3$=−190.47 | | | |
| | | $T_2$=8.00 | 1.93664 | 20.8 |
| | $R_4$=43.053 | | | |
| | | $S_2$=7.33 | | |
| 3 | $R_5$=94.442 | | | |
| | | $T_3$=13.62 | 1.94283 | 36.1 |
| | $R_6$=−94.442 | | | | wherein, from front to rear, the lens elements are numbered from 1 to 3, the corresponding indices of refraction, N, and Abbe numbers, V, are listed for each of the lens elements, the radii are numbered from $R_1$ to $R_6$, the thicknesses are numbered from $T_1$ to $T_3$ and the air spaces are numbered from $S_1$ to $S_2$.

4. A three element projection lens comprising, from front to rear, a positive meniscus element, a biconcave element and a biconvex element, said lens having a focal length of 100 millimeters when constructed according to the parameters in the following table:

| Element | Radius (mm) | Thickness or Separation (mm) | N | V |
|---|---|---|---|---|
| 1 | $R_1$=44.043 | | | |
| | | $T_1$=12.00 | 1.94283 | 36.1 |
| | $R_2$=154.22 | | | |
| | | $S_1$=9.45 | | |
| 2 | $R_3$=−225.71 | | | |
| | | $T_2$=5.78 | 1.94910 | 20.4 |
| | $R_4$=38.942 | | | |
| | | $S_2$=8.89 | | |
| 3 | $R_5$=98.549 | | | |
| | | $T_3$=14.57 | 1.94283 | 36.1 |
| | $R_6$=−98.549 | | | | wherein, from front to rear, the lens elements are numbered from 1 to 3, the corresponding indices of refraction, N, and Abbe numbers, V, are listed for each of the lens elements, the radii are numbered from $R_1$ to $R_6$, the thicknesses are numbered from $T_1$ to $T_3$ and the air spaces are numbered from $S_1$ to $S_2$.

5. A three element projection lens comprising, from front to rear, a positive meniscus element, a biconcave element and a biconvex element, said lens having a focal length of 100 millimeters when constructed according to the parameters in the following table:

| Element | Radius (mm) | Thickness or Separation (mm) | N | V |
|---|---|---|---|---|
| 1 | $R_1$=43.418 | | | |
| | | $T_1$=10.597 | 1.94283 | 36.1 |
| | $R_2$=152.15 | | | |
| | | $S_1$=10.120 | | |
| 2 | $R_3$=−234.00 | | | |
| | | $T_2$=5.089 | 1.94910 | 20.4 |
| | $R_4$=38.567 | | | |
| | | $S_2$=8.982 | | |
| 3 | $R_5$=97.978 | | | |
| | | $T_3$=16.710 | 1.94283 | 36.1 |
| | $R_6$=−97.978 | | | | wherein, from front to rear, the lens elements are numbered from 1 to 3, the corresponding indices of refraction, N, and Abbe numbers, V, are listed for each of the lens elements, the radii are numbered from $R_1$ to $R_6$, the thicknesses are numbered from $T_1$ to $T_3$ and the air spaces are numbered from $S_1$ to $S_2$.

6. A three element lens comprising, from front to rear, a positive meniscus element, a biconcave negative element and a biconvex positive element, each of said elements being formed of a glass having a Abbe number which is less than 40, wherein the lens has a focal length F and the radii of curvature, R, the thicknesses, T, and the air spaces, S, as numbered by subscript fron front to rear, are as defined by the following inequalities:

$$0.40F < R_1 < 0.50F$$
$$1.5F < R_2 < 2.0F$$
$$1.8F < -R_3 < 2.4F$$
$$0.35F < R_4 < 0.45F$$
$$0.90F < R_5 < 1.0F$$
$$0.90F < -R_6 < 1.0F$$
$$0.10F < T_1 < 0.20F$$
$$0.05F < T_2 < 0.10F$$
$$0.10F < T_3 < 0.20F$$
$$0.05F < S_1 < 0.15F$$
$$0.05F < S_2 < 0.10F$$

* * * * *

PO-1050
(5/69)

UNITED STATES PATENT OFFICE
CERTIFICATE OF CORRECTION

Patent No. __3,838,910__   Dated __October 1, 1974__

Inventor(s) __Paul L. Ruben__

It is certified that error appears in the above-identified patent and that said Letters Patent are hereby corrected as shown below:

Columns 3 and 4, (Table I), line 51, after "19mm", delete "f/2.5" and insert --f/3.5--

Signed and sealed this 17th day of December 1974.

(SEAL)
Attest:

McCOY M. GIBSON JR.
Attesting Officer

C. MARSHALL DANN
Commissioner of Patents